United States Patent
Zhuang

(10) Patent No.: US 11,146,482 B2
(45) Date of Patent: Oct. 12, 2021

(54) NETWORK PATH OPTIMIZATION METHOD AND SYSTEM

(71) Applicant: CLOUDMINDS (SHENZHEN) ROBOTICS SYSTEMS CO., LTD., Shenzhen (CN)

(72) Inventor: Guangtao Zhuang, Shenzhen (CN)

(73) Assignee: CLOUDMINDS ROBOTICS CO., LTD., Shanghai (CN)

(*) Notice: Subject to any disclaimer, the term of this patent is extended or adjusted under 35 U.S.C. 154(b) by 20 days.

(21) Appl. No.: 16/783,476

(22) Filed: Feb. 6, 2020

(65) Prior Publication Data

US 2020/0177496 A1    Jun. 4, 2020

Related U.S. Application Data

(63) Continuation of application No. PCT/CN2017/106577, filed on Oct. 17, 2017.

(51) Int. Cl.
| H04L 12/707 | (2013.01) |
| H04L 12/26 | (2006.01) |
| H04L 12/725 | (2013.01) |

(52) U.S. Cl.
CPC ............ *H04L 45/22* (2013.01); *H04L 43/16* (2013.01); *H04L 45/302* (2013.01); *H04L 45/306* (2013.01)

(58) Field of Classification Search
CPC combination set(s) only.
See application file for complete search history.

(56) References Cited

U.S. PATENT DOCUMENTS

| 8,027,261 | B2* | 9/2011 | Charzinski | H04L 41/5009 370/238 |
| 2002/0101822 | A1* | 8/2002 | Ayyagari | H04L 45/04 370/235 |
| 2007/0047446 | A1 | 3/2007 | Dalal et al. | |
| 2010/0165987 | A1 | 7/2010 | Takeguchi et al. | |
| 2016/0150488 | A1* | 5/2016 | Luo | H04W 52/265 370/328 |
| 2018/0324082 | A1* | 11/2018 | Hao | H04L 41/0823 |
| 2019/0349307 | A1* | 11/2019 | Wu | H04L 45/745 |
| 2020/0228436 | A1* | 7/2020 | Zhu | H04L 45/121 |

FOREIGN PATENT DOCUMENTS

| CN | 101427497 A | 5/2009 |
| CN | 102075424 A | 5/2011 |
| CN | 102136994 A | 7/2011 |
| CN | 104579567 A | 4/2015 |
| CN | 106231633 A | 12/2016 |
| CN | 106716937 A | 5/2017 |

OTHER PUBLICATIONS

1st Office action dated Mar. 20, 2020 by the CN Office; Appln. No. 201780002591.8.
International Search Report dated Jul. 6, 2018; PCT/CN2017/06577.

* cited by examiner

*Primary Examiner* — Xavier S Wong

(57) ABSTRACT

A network path optimization method includes: in response to a network access request, computing and sending an optimal path having a path code and carrying a path parameter; adding a path tag to the optimal path based on a real path; determining a parameter variation between the optimal path and the real path based on the path parameter and the path tag; and updating the optimal path and the path parameter based on the parameter variation.

7 Claims, 7 Drawing Sheets

NETWORK PATH OPTIMIZATION METHOD AND SYSTEM

CROSS-REFERENCE TO RELATED APPLICATIONS

This application is a continuation of International Application No. PCT/CN2017/106577, with an international filing date of Oct. 17, 2017, the entire contents of which are incorporated herein by reference.

TECHNICAL FIELD

The present application relates to the field of application delivery network (ADN), and in particular, relates to a network path optimization method and system based on data analysis.

BACKGROUND

With enhancement of hardware processing capabilities specific to network transmission and popularity of mobile terminals, network loads are becoming greater and greater, and users are imposing stricter and stricter requirements on network transmission performance and security.

An application delivery network (ADM), by using a corresponding network optimization/acceleration device, ensures that service applications of the users may be quickly, securely and reliability delivered to internal users and external service clusters by means of software and hardware devices and network optimization.

SUMMARY

An embodiment of the present application provides a network path optimization method. The method includes: in response to a network access request, computing and sending an optimal path having a path code and carrying a path parameter; adding a path tag to the optimal path based on a real path; determining a parameter variation between the optimal path and the real path based on the path parameter and the path tag; and updating the optimal path and the path parameter based on the parameter variation.

Another embodiment of the present application provides a network path optimization method. The method includes: in response to a network access request, computing and sending an optimal path having a path code and carrying a path parameter; acquiring a parameter variation between the optimal path and a real path by analyzing the path parameter and a path tag, the path tag being added to the optimal path based on a variation of the real path; and updating the optimal path and the path parameter based on the parameter variation.

Another embodiment of the present application provides a network path optimization system. The system includes: a control server, a plurality of network access terminals and a cluster of data processing terminals, the plurality of network access terminals constructing a network, the plurality of network access terminals being communicably connected to the control server and the data processing terminal cluster, and the control server being communicably connected to the data processing terminal cluster; wherein the control server is configured to, in response to a network access request, compute and send an optimal path having a path code and carrying a path parameter; the access network terminal is configured to add a path tag to the optimal path based on a real path; the cluster of data processing terminals is configured to determine a parameter variation between the optimal path and the real path based on the path parameter and the path tag; and the control server is further configured to update the optimal path and the path parameter based on the parameter variation.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

For clearer descriptions of the objectives, technical solutions, and advantages of the present application, the present application is further described with reference to specific embodiments and attached drawings. It should be understood that the specific embodiments described herein are only intended to explain the present application instead of limiting the present application.

In traditional network optimization of the application delivery network, selection of an optimal path is dependent on a network delay and a packet loss ratio and the like information that are detected in real time, and finally an optimal path is selected based on a shortest path algorithm. The current path and network conditions may be judged each minute based on the current detected data, to determine whether to switch a path, with no history reference data.

However, since the network environment is complicated, the detected data is occasional, and after a computed optimal path is linked, the connection may possibly be unstable. The path accessed is a path selected based on an optimal path algorithm. Since the network is complicated, network conditions between two adjacent devices on the optimal path may be subject to a fault and thus the devices may not be linked or the like, or some link errors or the like may be caused.

The optimal path in the related art fails to accurately reflect a real link path, and thus history path conditions fail to be indicated. In addition, for some special customers, paths need to be selected manually based on experience. During path selection, no history data may be referenced, and thus reliability and efficiency are not high. Therefore, the network optimization solution in the application delivery network in the related art needs to be further improved.

In the network path optimization method and system according to the embodiments of the present application, a dynamically adjusted optimal path is provided in response to a user request, when a network access terminal is accessed, a path tag may be added based on a parameter variation between a real path and an optimal path, and a history log may be established, such that the optimal path is dynamically updated based on the parameter variation and the path tag. In this way, switching frequency of link paths is reduced, and network links are more stable.

Figure 1:
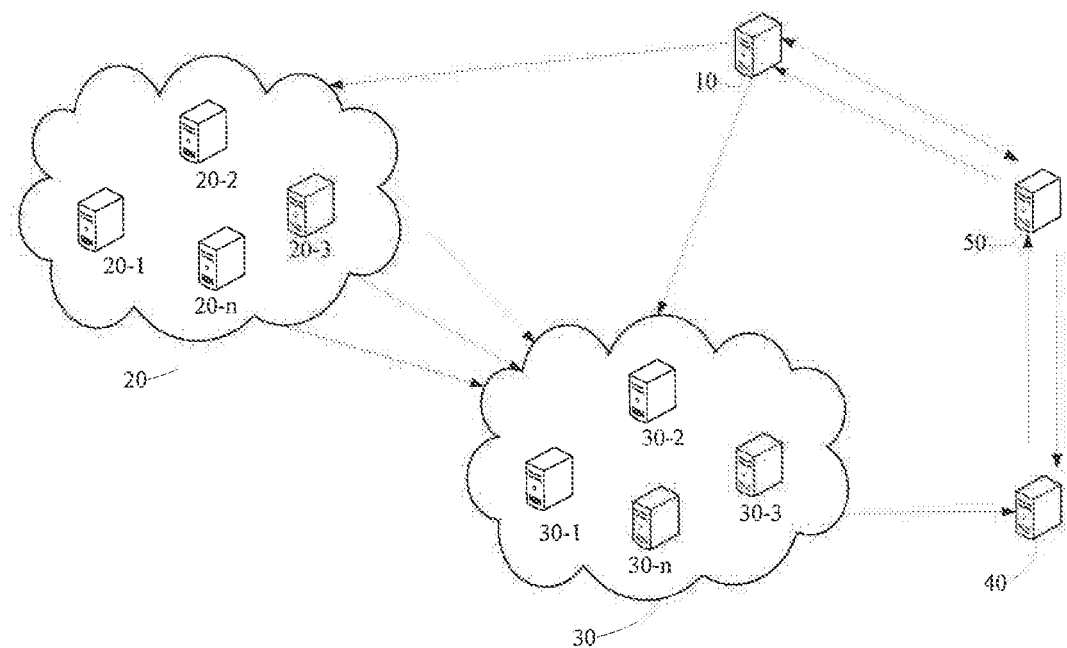
FIG. 1 is a schematic architectural diagram of a network path optimization system according to an embodiment of the present application.

As illustrated in FIG. 1, the network path optimization method and system are applied to an application delivery network (ADN), and a network optimization server cluster is constructed, which includes: an application delivery network 20 constructed by network access terminals, a control server 10, a data processing terminal cluster 30 for practicing massive data analysis, a data storage server 40 and an interface server 50. The network path optimization system codes a computed optimal path, adds a path parameter and an event tag, controls the control server 10 as a processing center based on functionality of servers, accelerates establishment a link between access paths, reduces switching frequency of link paths, and makes network links more stable.

The application delivery network 20 is constructed by a plurality of network access terminals 20-1, 20-2, 20-3 to 20-n. These network access terminals are network access points of the application delivery network 20. The network access points are located on an outer side of the edge of the network, and are access points to the interior of the network. Services provided by an Internet service provider (ISP) are accessed via the network access terminals. The services include Internet access, wide area network connection or public switched telephone network (PSTN). The network access terminal (a POP terminal) provides a link to a service and a station. With respect to the Internet service provider, the network access terminal is a network access point for access the Internet from one place to another. Generally, an ISP or an online service provider has one or a plurality of network access points on the Internet. The number of network access points owned by the ISP may be used as a standard for measuring scale and growth ratio of the service provider. The network access terminal may be independent of a server node or may be mounted in a leased space of a telecommunication carrier, and a network access end generally includes a router, a server and the like.

The data processing terminal cluster 30 receives the optimal path and the path tag added by the application delivery network 20 to the optimal path by virtue of massive data processing, to extract information of the real path and update reference data for forming the optimal path.

Embodiment 1

Figure 3:
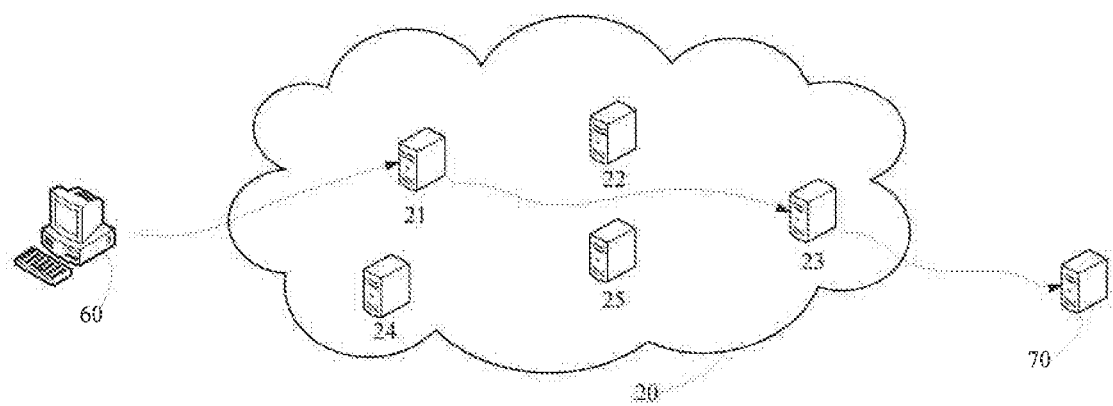
FIG. 3 is a schematic diagram of a real path in the network path optimization system according to an embodiment of the present application.

Further referring to FIG. to FIG. 3, a network path optimization system according to this embodiment includes a control server 10, a plurality of network access terminals 20-1 to 20-n, a data storage server 40, an interface server 50 and a cluster of data processing terminals 30-1 to 30-n. The plurality of network access terminals 20-1 to 20-n are networked to construct an application delivery network. The plurality of network access terminals 20-1 to 20-n are connected to the control server, and the plurality of network access terminals 20-1 to 20-n are communicably connected to the cluster of data processing terminals 30-1 to 30-n. The control server 10 is communicably connected to the cluster of data processing terminals 30-1 to 30-n. Parameter variation data generated by the cluster of data processing terminals 30-1 to 30-n is sent to the data storage server 40 for storage. The control server 10 periodically requests a path parameter of an optimal path and a parameter variation thereof from the interface server 50. The path tag added by the network access terminals 20-1 to 20-n and the history log generated thereby are stored in the cluster of data processing terminals 30-1 to 30-n. The data storage server 40 stores a parameter variation result that is computed, and the optimal path is modified and adjusted based on the path parameter and the parameter variation.

When a user initiates a network access request, in response to the network access request, the control server 10 computes an optimal path having a path code and carrying a path parameter, sends information of the optimal path to a network access terminal for receiving the network access request, for example, the network access terminal 20-1, in the application delivery network 20, and meanwhile sends the information of the optimal path to the cluster of data processing terminals 30-1 to 30-n.

Upon receiving the optimal path having the path code and carrying the path parameter, the network access terminal 20-1 establishes a link based on the optimal path, and adds a path tag to the received optimal path based on a link condition of a real path, for example, a tag indicative of an average delay ratio and a packet loss ratio or an error code or the like between nodes.

The cluster of data processing terminals 30-1 to 30-n determines a parameter variation between the optimal path and the real path based on the path parameter and the path tag.

The cluster of data processing terminals 30-1 to 30-n is communicably connected to the data storage server 40. The data storage server 40 stores a computation result of the cluster of data processing terminals 30-1 to 30-n, for example, the parameter variation.

The control server 10 updates the optimal path based on the parameter variation, such that a stable and rapid connection link that is consistent with the network condition is provided in response to the user request.

Figure 8:
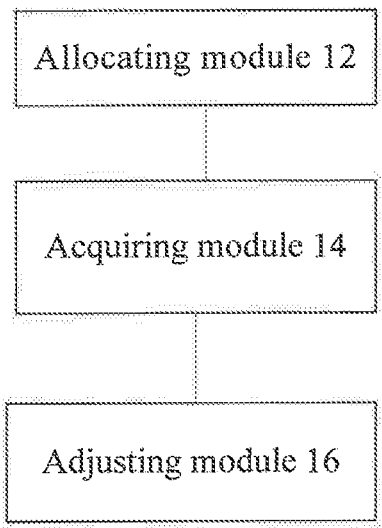
FIG. 8 is a schematic modular diagram of a control server in the network path optimization system according to an embodiment of the present application.

Referring to FIG. 8, the control server includes an allocating module 12, an acquiring module 14 and an adjusting module 16.

The optimal path is originated from a user terminal 60, and terminated at an access source station 70 through a plurality of access terminal nodes of the application delivery network 20, including a plurality of nodes. In this embodiment, the path parameter includes a path weight of a node and time elapsed for computing the optimal path; wherein the cluster of data processing terminals is further configured to analyze a delay ratio or a packet loss ratio or relevant parameter status and parameter variations between nodes on the optimal path, and determine node status.

On the network path optimization, the control server is intended to:

compute the optimal path having the path code and carrying the path parameter, and send the information of the optimal path to a network access terminal for receiving the network access request, for example, the network access terminal 20-1, in the application delivery network 20, and meanwhile send the information of the optimal path to the cluster of data processing terminals 30-1 to 30-n.

The acquiring module 14 acquires a parameter variation between the optimal path and the real path by analyzing the path parameter and the path tag, wherein the path tag is added to the optimal path based on the real path.

The adjusting module 16 updates the optimal path updated based on the parameter variation.

The optimal path may generally include a plurality of nodes. In this embodiment, the path parameter includes a path weight of a node and time elapsed for computing the optimal path.

The adjusting module 16 analyzes the delay ratio or the packet loss ratio between the nodes on the optimal path, and determines the node status.

The adjusting module 16 further adjusts the path weight of the node based on the node status, and updates the relevant path parameter and the optimal path based on the adjusted path weight.

The adjusting module 16 makes a corresponding adjustment based on varied parameter when computing the optimal path and selecting the path if the optimal path varies.

In this embodiment, the parameter variation further includes an error code, and the control server 10 predefines an adjustment threshold based on the error code. The control server 10 scans a parameter variation under a corresponding path based on the path code, and the control server 10 adjusts a path parameter of the corresponding path when a scanned error code is greater than or equal to an adjustment threshold. The control server 10 adjusts a weight of a node with the error code on the corresponding path when the scanned error code is constantly greater than or equal to the adjustment threshold. For example, when the weight is 0, it indicates that the node shall not be used any longer; and when the weight is 1, it indicates that the normal may be normally used.

When the control server 10 adjusts the optimal path, during data detection, the delay ratio or the packet loss ratio between two network access terminals 20 on the optimal path may be subject to a peak. In this case, the control server 10 may not know whether the peak accidentally occurs or not when computing the optimal path. To judge whether the peak is present in computing the optimal path, the control server 10 needs to make a judgment based on a history log. When the peak is present, the control server 10 may compute the optimal path based on an average time computed by the cluster, and thus the impact caused by the peak may be prevented when the control server 10 computes the optimal path.

Alternatively, the control server 10 periodically requests the information of the optimal path from the interface server. When the control server 10 detects that a network access terminal on the optimal path having a specific code is subject to an error code, if a ratio of occurrences of the error code reaches or even exceeds a ratio threshold predefined by the control server 10, the control server 10 may request the information of the optimal path for a longer time. If the ratio of occurrences of the error code constantly exceeds the ratio threshold predefined by the control server 10, the access terminal node may not be used, and the weight of the access terminal node is modified to 0. That is, the control server 10 denies the access terminal nodes with the weight of 0 when computing the optimal path.

Figure 9:
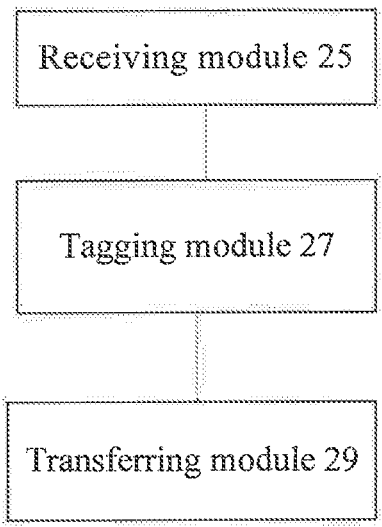
FIG. 9 is a schematic modular diagram of a network access terminal in the network path optimization system according to an embodiment of the present application.

Referring to FIG. 9, the plurality of network access terminals 20-1 to 20-n construct an application delivery network connected to the control server, wherein each network access terminal includes a receiving module 25, a tagging module 27 and a transferring module 29.

On the network path optimization, each of the network access terminals 20-1 to 20-n implements the following functions:

The receiving module 25 receives an optimal path having a path code and carrying a path parameter that is computed in response to a network access request sent by the control server 10.

The tagging module 27 adds a path tag to the optimal path based on a real path.

The transferring module 29 uploads the optimal path with the added path tag to a cluster of data processing terminals 30-1 to 30-n, wherein the cluster of data processing terminals 30-1 to 30-n determines a parameter variation between the optimal path and a real path based on the path parameter and the path tag.

The receiving module 25 receives the optimal path updated based on the parameter variation.

Figure 10:
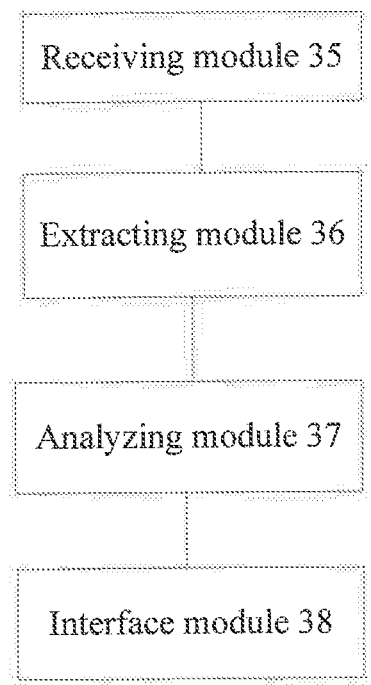
FIG. 10 is a schematic modular diagram of a data processing terminal in the network path optimization system according to an embodiment of the present application.

Referring to FIG. 10, each data processing terminal in the cluster of data processing terminals 30-1 to 30-n includes a receiving module 36, an extracting module 36, an analyzing module 37 and an interface module 38.

On the network path optimization, each data processing terminal implements the following functions:

The receiving module 35 receives an optimal path having a path code and carrying a path parameter that is computed in response to a network access request sent by the control server 10.

The extracting module 36 acquires a path tag that is added to the optimal path based on a real path and generated by the network access terminal.

The analyzing module 37 determines a parameter variation between the optimal path and the real path based on the path parameter and the path tag, wherein the parameter variation is used for updating the optimal path.

The interface module 38 transfers the parameter variation to be stored to data storage server 40.

Figure 2:
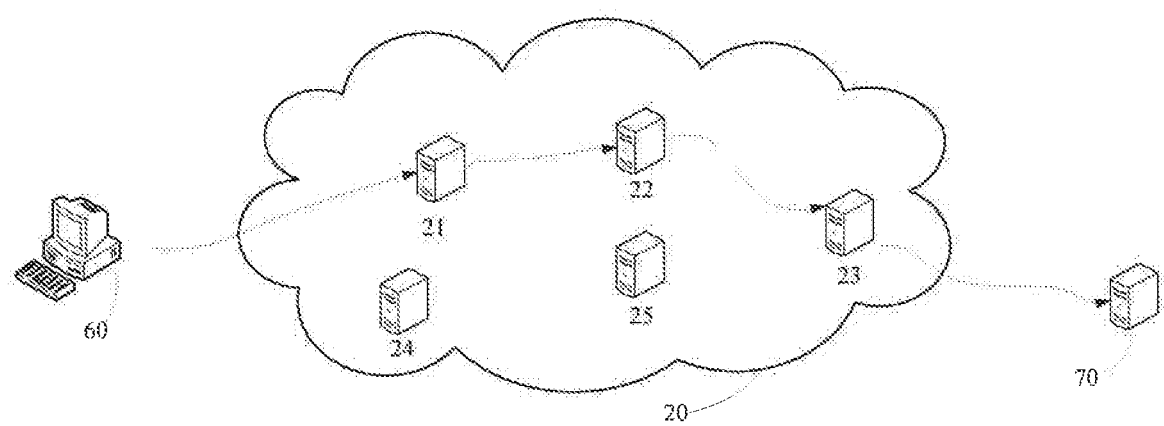
FIG. 2 is a schematic diagram of an optimal path in the network path optimization system according to an embodiment of the present application.

Referring to FIG. 2 and FIG. 3 together, the cluster of data processing terminals 30-1 to 30-n extracts the real path accessed by the user. This process is described as follows:

As illustrated in FIG. 2, when the user travels through the application delivery network 20 while accessing the access source station 70 via the terminal 60, the user may travel through a plurality of nodes on the optimal path delivered by the control server 10 to the network access terminals in the application delivery network 20. Due to network conditions, node status and the like factors, the real path of the user in the application delivery network is not necessarily the optimal path, and the real path may vary depending on the link and node status.

For the sake that the network path optimization system is capable of truly reflecting real link status of each optimal path and acquiring real access path information, the control server 10 needs to assign a path code (pathID) to each optimal path, and determine a path parameter for each optimal path, for example, time (pathTime) elapsed for computing the optimal path.

In this embodiment, a link information format delivered by the control server 10 to the network access terminal includes the path code (pathID), and the time (pathTime) for computing the optimal path. The cluster of data processing terminals 30-1 to 30-n judges variations of the path based on the path code while extracting the real path, wherein the path having the same path code is the real path that is currently accessed. The specifically accessed network access terminal adds a path tag (sessionID) on the link information based on the variation between the real path and the optimal path, such that the link information includes three parts, which are specifically, the path code (pathID), the time (pathTime) elapsed for computing the optimal path, and the path tag (sessionID). The accessed network access terminal extracts the variations of the path codes, and establishes the history log.

For example, in an application delivery network of a company, the control server detects based on history logs that an optimal path between a user terminal and an access source station frequently varies, a detection result at a moment is subject to a high delay ratio and a high packet loss ratio. By analysis based on the history log, this case is occasional, and the optimal path may not be adjusted but the existing link path may be still used. Therefore, reference to the history log may prevent frequent path switching caused by an occasional case. In another optimization scenario, after the optimal path is linked, a network access terminal node is frequently subject to link disconnection. Based on the statistics of the history logs, the network access terminal node is frequently disconnected from the link, and thus the control server modifies the weight of the network access terminal node to avoid this node but select another network access terminal node during path selection.

The operating process of the network path optimization system is as follows: The control server 10 detects a delay ratio, a packet loss ratio and the like information between each two network access terminal nodes and the access source station, and computes an optimal path based on the data. Information of the optimal path is sent to the application delivery network 20, and meanwhile uploaded to the cluster of data processing terminals 30-1 to 30-n. In addition, the delay ratio, the packet loss ratio, the error code and the like information detected by the control server 10 are uploaded to the cluster of data processing terminals 30-1 to 30-n. For the sake that data allocation and transmission and data analysis are directed to a particular client access path, in this technical solution, the path code (pathID, wherein each optimal path has a unique identifier) and time (pathTime, which is a time identifier for each optimal path computation) are added to the optimal path (BestPath). The format thereof is as follows:

BestPath: rtt, lost, weight, pathID, timeID

BestPath: indicates an optimal path computed by the control server 10.

rtt: indicates an average delay of the optimal path.

lost: indicates an average packet loss ratio of the optimal path.

pathID: indicates a path code of the path, wherein the same path has the same path ID.

timeID: indicates the time elapsed for computing the optimal path.

The access log generated by each network access terminal node in the application delivery network may be likewise uploaded to the cluster of data processing terminals 30-1 to 30-n. Due to the network and the nodes, the real path accessed by the user may be somewhat different from that determined by the control server 10. For example, one node on the optimal path may be non-communicative, and in this case, the user may hop over this node. Therefore, each access log of the node may be added with a path code, time elapsed for computing the optimal path and a path tag (pathID/pathTime/sessionID). Assuming that each access log is originally accessContent, and is currently accessContent pathID/pathTime/sessionID.

The path code and the time elapsed for computing the optimal path are delivered by the smart control server 10 to the application delivery network 20, and the path tag is generated by the network access terminal node when the user accesses the network access terminal node. The path code, the time elapsed for computing the optimal path and the path tag are defined to conveniently find the real path accessed by the user.

The cluster of data processing terminals 30-1 to 30-n computes the path parameter and the history log of the optimal path, and sends a computation result of the error code, the average delay, the packet loss ratio and the like information of each path to the data storage server 40 for storage. The interface server 50 may proactively periodically sends the computed data to the control server 10, and meanwhile monitor a request form the control server 10. The control server 10 may make a corresponding adjustment with reference to the computed data when computing the optimal path based on the computed data.

Embodiment 2

Figure 4:
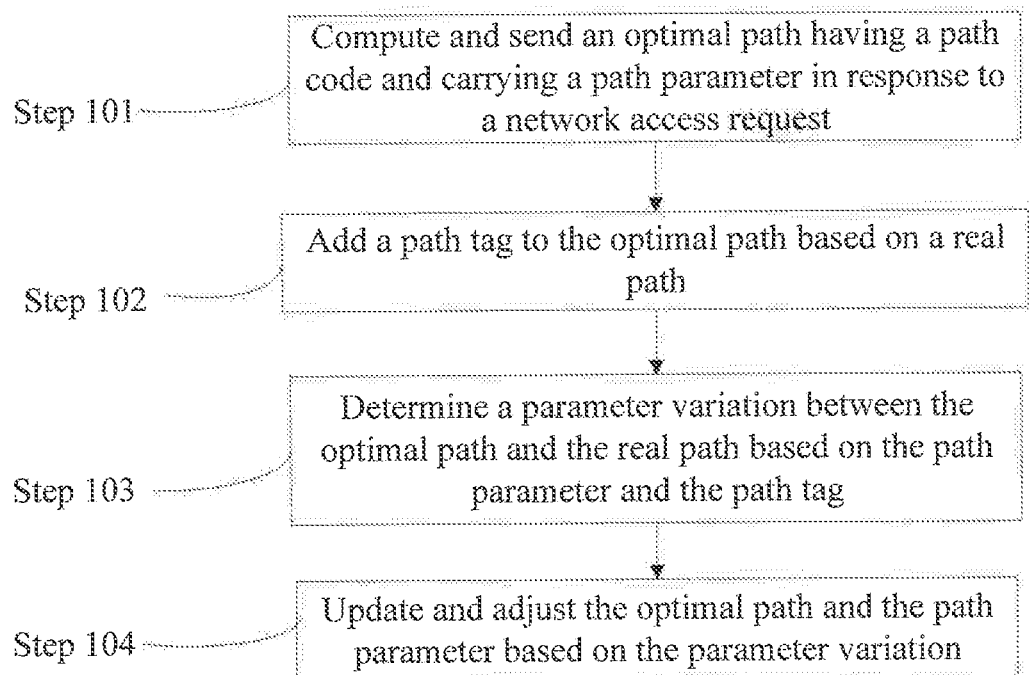
FIG. 4 is a schematic flowchart of a network path optimization method according to an embodiment of the present application.

Referring to FIG. 4, in the network path optimization method, in response to a request from a user, an optimal path is provided; a path tag is added based on a real path at a network access terminal; a history log of the path tag is established; an average delay ratio, a packet loss ratio, an error code and the like parameter variation results between nodes are computed; and the optimal path is optimized based on the parameter variation, such that a switching frequency of the link path is lowered, and the network link is more rapid and stable.

The network path optimization method according to this embodiment includes the following steps:

step 101: in response to a network access request, computing and sending an optimal path having a path code and carrying a path parameter, wherein the control server 10, in response to the network access request from the user, computes the optimal path having the path code and carrying the path parameter, ands sends the optimal path to a network access terminal interconnected to a user terminal in the application delivery network 20, and meanwhile sends the optimal path to the cluster of data processing terminals 30-1 to 30-n;

step 102: adding a path tag to the optimal path based on a real path, wherein the network access terminal interconnected to the user terminal adds the path tag to the optimal based on the real path;

step 103: determining a parameter variation between the optimal path and the real path based on the path parameter and the path tag, wherein the cluster of data processing terminals 30-1 to 30-n determines the parameter variation between the optimal path and the real path based on the path parameter and the path tag; and step 104: updating the optimal path based on the parameter variation; wherein the control server 10 updates the optimal path based on the parameter variation.

The optimal path includes a plurality of nodes, and the path parameter includes a path weight of a node and time elapsed for computing the optimal path.

The step of determining a parameter variation between the optimal path and the real path based on the path parameter and the path tag includes the following steps:

analyzing a delay ratio or a packet loss ratio between the nodes on the optimal path, and determining node status; and adjusting the path weight of the node based on the node status.

The network path optimization method further includes storing the parameter variation, the adjusted optimal path and the path parameter to a data storage server.

The parameter variation includes an error code, and the step of updating the optimal path based on the parameter variation includes the following steps:

predefining an adjustment threshold based on the error code;

scanning a parameter variation under a corresponding path based on the path code; and when a scanned error code is greater than or equal to an adjustment threshold, adjusting a path parameter of a corresponding path; and when the scanned error code is constantly greater than or equal to the adjustment threshold, adjusting a weight of a node with the error code on the corresponding path.

Hereinafter, the network path optimization method is described from the perspective of the control server.

Figure 5:
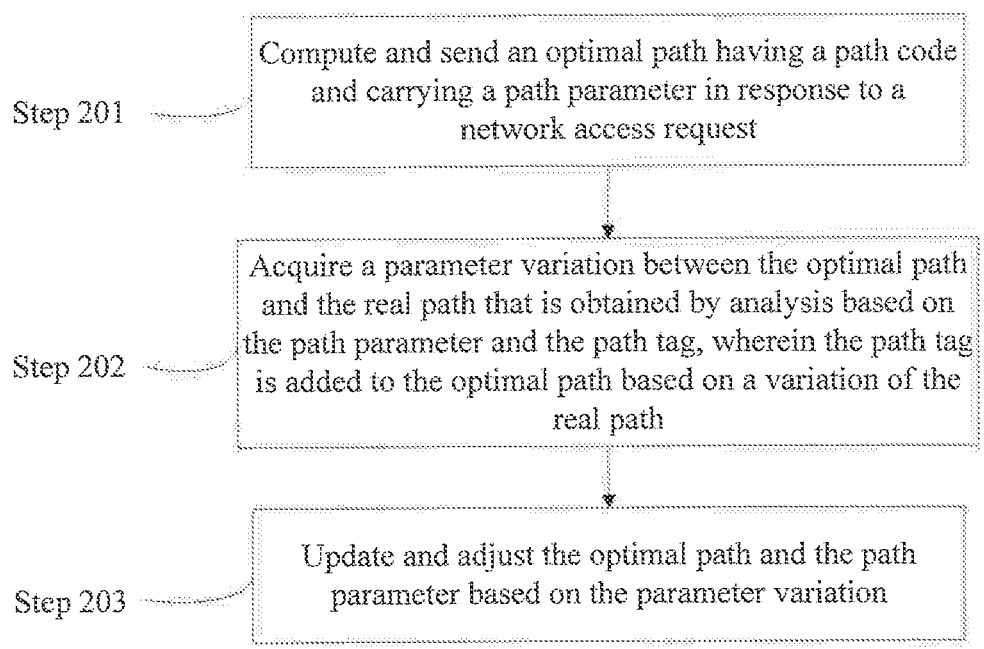
FIG. 5 is a schematic flowchart of operations at a control server in the network path optimization method according to an embodiment of the present application.

Referring to FIG. 5, a flowchart of practicing the network path optimization method by the data processing terminals is given.

The network path optimization method by the data processing terminals includes the following steps:

step 201: in response to a network access request, computing and sending an optimal path having a path code and carrying a path parameter;

step 202: acquiring a parameter variation between the optimal path and the real path that is obtained by analysis based on the path parameter and the path tag, wherein the path tag is added to the optimal path based on the real path; and step 203: updating the parameter variation and storing the path variation.

The step of updating the parameter variation includes:

analyzing a delay ratio or a packet loss ratio between the nodes on the optimal path, and determining node status; and adjusting a path weight of the node based on the node status.

Figure 6:
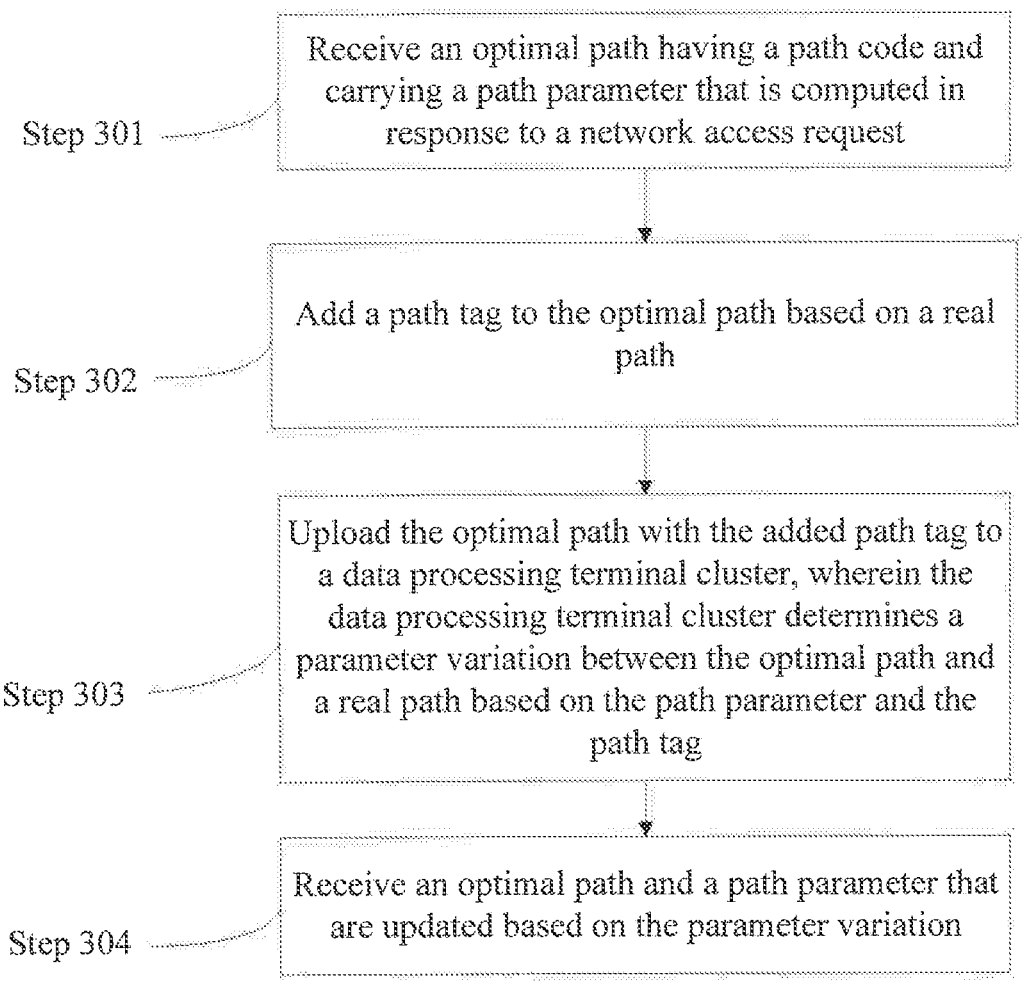
FIG. 6 is a schematic flowchart of operations at a network access terminal in the network path optimization method according to an embodiment of the present application.

Referring to FIG. 6, a flowchart of practicing the network path optimization method by each network access terminal is given.

The network path optimization method by each network access terminal according to this embodiment includes the following steps:

step 301: receiving an optimal path having a path code and carrying a path parameter that is computed in response to a network access request, wherein the optimal path is originated from the control server 10;

step 302: adding a path tag to the optimal path based on a real path;

step 303: uploading the optimal path with the added path tag to a data processing terminal cluster, wherein the data processing terminal cluster determines a parameter variation between the optimal path and a real path based on the path parameter and the path tag; and step 304: receiving an optimal path updated based on the parameter variation, wherein the optimal path is sent by the control server 10.

Figure 7:
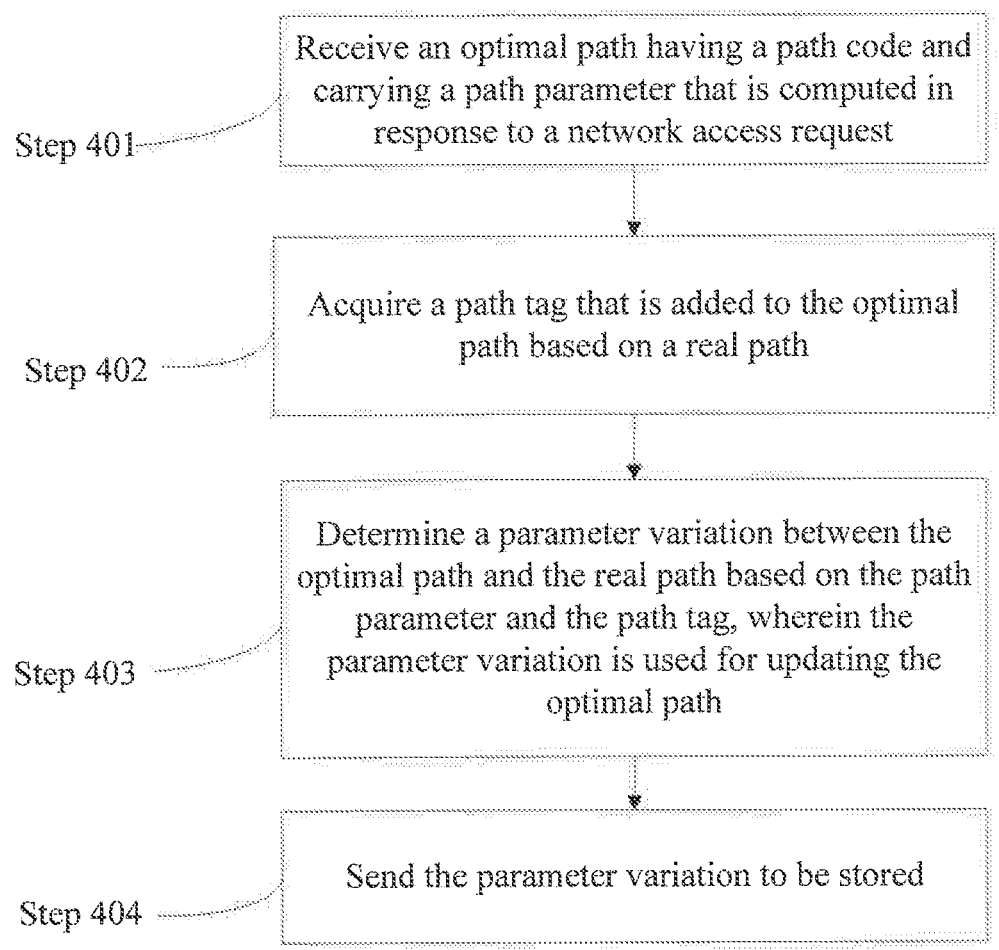
FIG. 7 is a schematic flowchart of operations at a data processing terminal in the network path optimization method according to an embodiment of the present application.

Referring to FIG. 7, a flowchart of practicing the network path optimization method by each data processing terminal is given.

The network path optimization method by each data processing terminal according to this embodiment includes the following steps:

step 401: receiving an optimal path having a path code and carrying a path parameter that is computed in response to a network access request, wherein the optimal path is originated from the control server 10;

step 402: acquiring a path tag that is added to the optimal path based on a real path, and acquiring data of the path tag from a corresponding network access terminal;

step 403: determining a parameter variation between the optimal path and the real path based on the path parameter and the path tag, wherein the parameter variation is used for updating the optimal path; and step 404: sending the parameter variation to be stored, wherein the parameter variation is stored in the data storage server 40.

in the network path optimization method and system according to the embodiments of the present application, a network access terminal provides an optimal path in response to a request from a user; the network access terminal adds a path tag to the optimal path based on a real path, for example, an average delay ratio and a packet loss ratio or an error code or the like between nodes, establishes a history log based on the path tag, computes a parameter variation based on the history log, and updates the optimal path based on the parameter variation, such that switching frequency of link paths is reduced, and network links are more stable. In addition, in the network path optimization method and system, a control server acquires a parameter variation of a coded optimal path; the control server adjusts the path parameter and the optimal path based on a parameter variation computation result stored in the data storage server 40, for example, error rate and the like information, to provide an optimal path which is dynamically adaptive to the current network environment or adjust a weight of a node on the optimal path, such that the optimal path is updated and adjusted.

Embodiment 3

Figure 11:
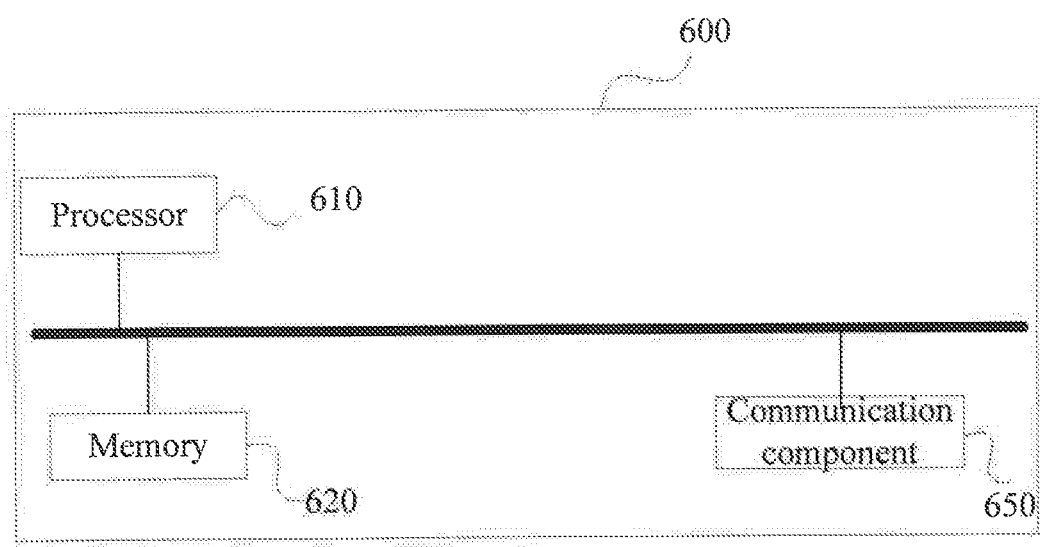
FIG. 11 is a schematic hardware architectural diagram of the network path optimization method according to an embodiment of the present application.

FIG. 11 is a schematic structural diagram illustrating hardware of an electronic device 600 for performing the network path optimization method according to an embodiment of the present application.

As illustrated in FIG. 11, the electronic device 600 includes at least one processor 610, a memory 620 and a communication component 650, and FIG. 11 uses one processor 610 as an example. The memory 620 stores instructions executable by the at least one processor 610. The instructions, when being executed by the at least one processor, may establish a data channel via the communication component 650, and cause the at least one processor to perform the network path optimization method.

The at least one processor 610, the memory 620 and the communication component 650 may be connected via a bus or in another manner, and FIG. 11 uses the bus as an example.

The memory 620, as a non-volatile computer-readable storage medium, may be configured to store non-volatile software programs, and non-volatile computer executable programs and modules, for example, the program instructions/modules (for example, the allocating module 12, the acquiring module 14 and the adjusting module 16 as illustrated in FIG. 11, and the receiving module 25, the tagging module 27 and the transferring module 29 as illustrated in FIG. 12) corresponding to the network path optimization methods according to the embodiments of the present application. The non-volatile software programs, instructions and modules stored in the memory 620, when being executed by the processor 610, cause the processor 610 to perform various function applications and data processing of a server, that is, performing the network path optimization methods according to the above method embodiments.

The memory 620 may include a program memory area and data memory area, wherein the program memory area may store operation systems and application programs needed by at least function; and the data memory area may store data created according to the usage of the electronic device of a robot. In addition, the memory 620 may include a high speed random access memory, or include a non-volatile memory, for example, at least one disk storage device, a flash memory device, or another non-volatile solid storage device. In some embodiments, the memory 620 optionally includes the memory remotely arranged relative to the processor 610, and such remote memory may be connected to the electronic device over the network. Examples of the above network include, but not limited to, the Internet, Intranet, local area network, mobile communication network and a combination thereof.

One or more modules are stored in the memory 620, which, when being executed by the at least one processor 610, perform the network path optimization method according to any of the above method embodiments, for example, performing steps 101 to 104 in the method as illustrated in FIG. 4, steps 201 to 203 in the method as illustrated in FIG. 5 and steps 301 to 304 in the method as illustrated in FIG. 6; and implementing the functions of the allocating module 12, the acquiring module 14 and the adjusting module 16 as illustrated in FIG. 8, and the receiving module 25, the tagging module 27 and the transferring module 29 as illustrated in FIG. 9.

The product may perform the method according to the embodiments of the present application, has corresponding function modules for performing the method, and achieves the corresponding beneficial effects. For technical details that are not illustrated in detail in this embodiment, reference may be made to the description of the methods according to the embodiments of the present application.

An embodiment of the present application provides a non-volatile computer-readable storage medium. The computer-readable storage medium stores computer-executable instructions, which, when being executed by at least one processor, cause the at least one processor to perform steps 101 to 104 in the method as illustrated in FIG. 4, steps 201 to 203 in the method as illustrated in FIG. 5 and steps 301 to 304 in the method as illustrated in FIG. 6, and further implement the functions of the allocating module 12, the acquiring module 14 and the adjusting module 16 as illustrated in FIG. 8, and the receiving module 25, the tagging module 27 and the transferring module 29 as illustrated in FIG. 9.

The above described apparatus embodiments are merely for illustration purpose only. The units which are described as separate components may be physically separated or may be not physically separated, and the components which are illustrated as units may be or may not be physical units, that is, the components may be located in the same position or may be distributed into a plurality of network units. A part or all of the modules may be selected according to the actual needs to achieve the objectives of the technical solutions of the embodiments.

According to the above embodiments of the present application, a person skilled in the art may clearly understand that the embodiments of the present application may be implemented by means of hardware or by means of software plus a necessary general hardware platform. Persons of ordinary skill in the art may understand that all or part of the steps of the methods in the embodiments may be implemented by a program instructing relevant hardware. The program may be stored in a computer-readable storage medium and may be executed by at least one processor. When the program runs, the steps of the methods in the embodiments are performed. The storage medium may be any medium capable of storing program codes, such as read-only memory (ROM), a random access memory (RAM), a magnetic disk, or a compact disc-read only memory (CD-ROM).

Finally, it should be noted that the above embodiments are merely used to illustrate the technical solutions of the present application rather than limiting the technical solutions of the present application. Under the concept of the present application, the technical features of the above embodiments or other different embodiments may be combined, the steps therein may be performed in any sequence, and various variations may be derived in different aspects of the present application, which are not detailed herein for brevity of description. Although the present application is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present application.

What is claimed is:

1. A network path optimization method, comprising:
   in response to a network access request, computing and sending an optimal path having a path code and carrying a path parameter, wherein the optimal path is established between a plurality of nodes, and the path parameter comprises a path weight of a node and time elapsed for computing the optimal path;
   adding a path tag to the optimal path based on a real path, wherein the path tag indicates a delay ratio and a packet loss ratio between nodes of the optimal path;
   determining a parameter variation between the optimal path and the real path based on the path parameter and the path tag; and
   updating the optimal path and the path parameter based on the parameter variation;
   wherein the determining the parameter variation between the optimal path and the real path based on the path parameter and the path tag comprises:
   analyzing a delay ratio or a packet loss ratio between the nodes on the optimal path, and determining node status; and
   adjusting the path weight of the node based on the node status.

2. The method according to claim 1, further comprising: storing the updated optimal path and the updated path parameter to a data storage server.

3. The method according to claim 1, wherein the parameter variation comprises an error code, and the step of updating the optimal path and the path parameter based on the parameter variation comprises:
predefining an adjustment threshold based on the error code;
scanning a parameter variation under a corresponding optimal path based on the path code; and
when a scanned error code is greater than or equal to an adjustment threshold, adjusting a path parameter of a corresponding path; and when the scanned error code is constantly greater than or equal to the adjustment threshold, adjusting a weight of a node with the error code on the corresponding path.

4. A network path optimization method, comprising:
in response to a network access request, computing and sending an optimal path having a path code and carrying a path parameter, wherein the optimal path is established between a plurality of nodes, and the path parameter comprises a path weight of a node and time elapsed for computing the optimal path;
acquiring a parameter variation between the optimal path and a real path by analyzing the path parameter and a path tag, the path tag being added to the optimal path based on a variation of the real path, wherein the updating the optimal path and the path parameter based on the parameter variation comprises:
analyzing a path parameter and a parameter variation between the nodes on the optimal path, determining node status, wherein the parameter variation comprises a delay ratio and a packet loss ratio; and
adjusting the path weight of the node based on the node status.

5. A network path optimization system, comprising a control server, a plurality of network access terminals and a cluster of data processing terminals, the plurality of network access terminals constructing a network, the plurality of network access terminals being communicably connected to the control server and the data processing terminal cluster, and the control server being communicably connected to the data processing terminal cluster; wherein
the control server is configured to, in response to a network access request, compute and send an optimal path having a path code and carrying a path parameter, wherein the optimal path comprises a plurality of nodes, the path parameter comprises path weights of the nodes and time elapsed for computing the optimal path;
the access network terminal is configured to add a path tag to the optimal path based on a real path, wherein the path tag indicates a delay ratio and a packet loss ratio between nodes of the optimal path;
the cluster of data processing terminals is configured to determine a parameter variation between the optimal path and the real path based on the path parameter and the path tag; and
the control server is further configured to update the optimal path and the path parameter based on the parameter variation;
wherein the data processing terminal cluster is further configured to analyze a delay ratio or a packet loss ratio between nodes on the optimal path, and determine node status; and
the control server is further configured to adjust the path weights of the nodes based on the node status, and update the optimal path based on the path weights.

6. The system according to claim 5, further comprising a data storage server communicably connected to the data processing terminal cluster; wherein the data storage server is configured to store the parameter variation and the updated optimal path and path parameter.

7. The system according to any one of claim 5, wherein the parameter variation comprises an error code and an adjustment threshold predefined based on the error code; wherein the control server is further configured to scan the parameter variation under a corresponding path based on the path code; the control server is configured to adjust the path parameter of the corresponding path if the scanned error code is greater than or equal to the adjustment threshold; and the control server is configured to adjust the weight of a node which encounters an error code on the corresponding path if the scanned error code is constantly greater than or equal to the adjustment threshold.

* * * * *